April 8, 1930.                J. B. DRAHONOVSKY                1,753,882
                                  CARBURETOR
                              Filed Oct. 11, 1926
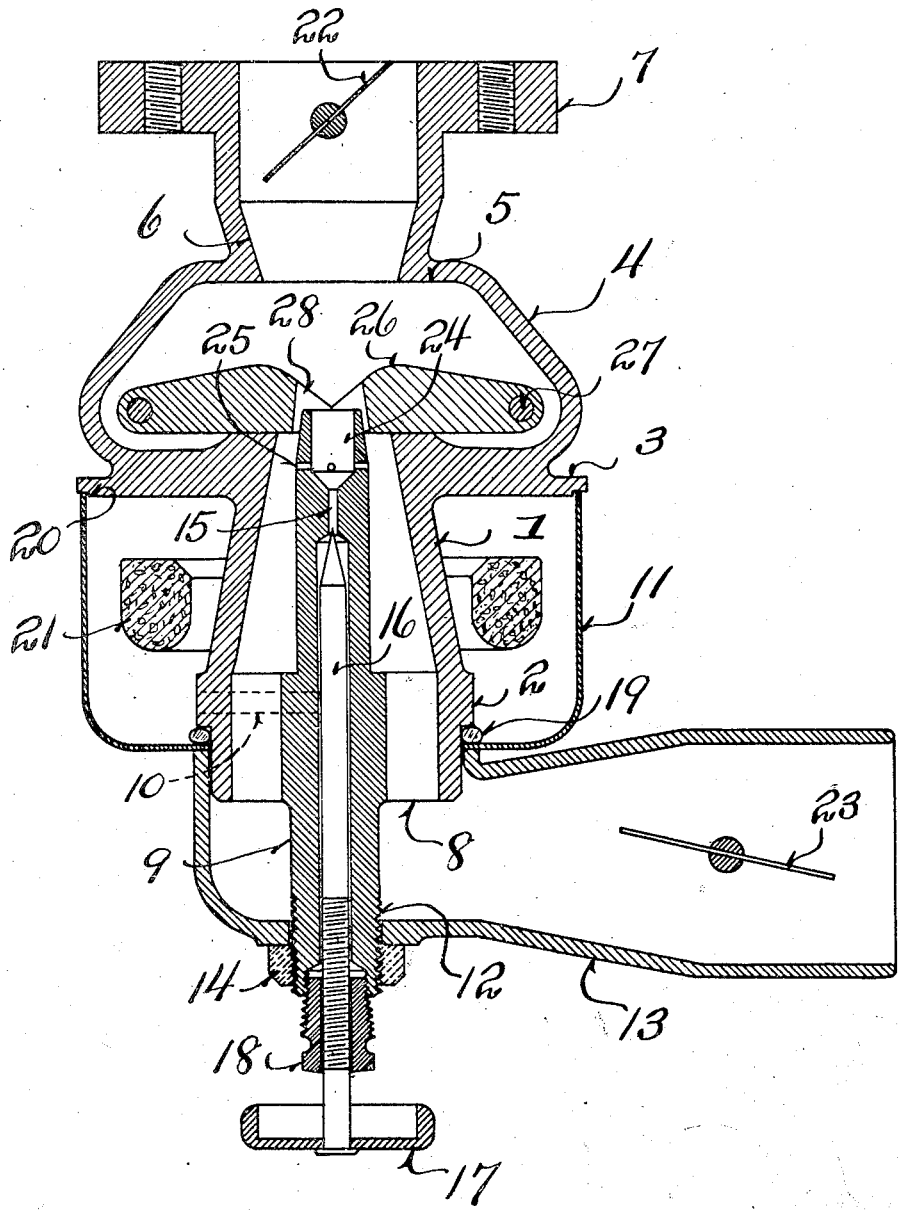
INVENTOR.
John B. Drahonovsky
BY
ATTORNEYS Patented Apr. 8, 1930

1,753,882

UNITED STATES PATENT OFFICE

JOHN B. DRAHONOVSKY, OF MILWAUKEE, WISCONSIN, ASSIGNOR OF ONE-TWENTIETH TO MATHEW FERKO, ONE-TWENTIETH TO MARY PUNCER, ONE-TWENTIETH TO FERDINAND KLANCNIK, ONE-TENTH TO HENRY W. BUER AND HERTHA BUER, THREE ONE-HUNDREDTHS TO JOSEPH SCHWEITZER AND CAROLINE SCHWEITZER, SEVEN ONE-HUNDREDTHS TO MAURICE A. GOLDBERG, TWO ONE-HUNDREDTHS TO FANNIE KOLLENZ, THREE ONE-HUNDREDTHS TO ANTON LEP, TWO ONE-HUNDREDTHS TO WILLIAM WAGNER, FORTY ONE-HUNDREDTHS TO A. A. STRELZIN, ONE ONE-HUNDREDTH TO JOHN STREICHEN, AND ONE ONE-HUNDREDTH TO PHELEP KINZFOGL, ALL OF MILWAUKEE, WISCONSIN

CARBURETOR

Application filed October 11, 1926. Serial No. 140,850.

This invention relates to carburetors.

Objects of this invention are to provide a novel form of carburetor which secures a high fuel economy, which automatically dilutes the mixture at high engine speeds by simple automatic mechanism, and which is so constructed that the air stream is constricted at slow engine speeds, such as idling, for instance, so that the correct mixture for the different speeds is automatically maintained.

Further objects are to provide a very compact arrangement of carburetor float chamber and mixing chamber so that the device may be mounted in a minimum of space and with the utmost ease.

Further objects are to provide a carburetor which has a minimum number of parts, which is easily constructed by ordinary machine shop methods, and which is extremely easy to adjust as it has merely one adjustment controlling the fuel flow.

An embodiment of the invention is shown in the accompanying drawings in which:—

The single figure is a vertical sectional view through the carburetor.

Referring to the drawing, it will be seen that the carburetor comprises a central conical sleeve 1 which is provided with an outwardly extending flange 2 adjacent its lower portion and with an outwardly extending flange 3 adjacent its upper portion.

Further, it will be seen that this member continues upwardly to form the mixing chamber 4. Preferably, this mixing chamber is also of tapered contour and has an upper shoulder 5 through which the discharge tapered opening 6 passes. The uppermost portion of the member is provided with apertured flanges 7 to permit its ready attachment. This main member 1 is provided with inwardly extending webs 8 which carry an integral central standard 9. This standard is hollow and communicates by means of a duct 10 with a float chamber 11.

It is to be noted that the lower portion of the central standard 9 is externally threaded as indicated at 12, and receives the air pipe 13, such pipe being held in place by means of a clamping nut 14. The upper portion of the hollow standard 9 is provided with a small aperture or duct 15 which is controlled by the pointed end of a needle valve 16. This needle valve is provided with an adjusting hand wheel or knob 17 at its lower end and is threaded into the lower portion of the hollow standard 9. A packing gland 18 is screwed into the lower portion of the hollow standard 9 in order to compress packing against the valve stem and insure a tight joint.

The float chamber 11 is merely a stamped sheet metal member which has an inwardly curved apertured bottom portion resting upon the upturned flanges of the pipe 13. This bottom portion is sealed against the shoulder 2 by means of a gasket or packing ring 19. Clearly, when the nut 14 is tightened, the gasket 19 is compressed tightly against the inner side of the member 11 and forms a tight joint therewith. The upper marginal edge of the member 11 seats within a shouldered portion 20 of the flange 3 and completes the closing of the float chamber. This float chamber is supplied in any suitable manner, not shown, and the level of the fuel therein is controlled in the usual manner by means of the float 21. The usual throttle valve 22 and choke valve 23 are provided in the inlet and outlet portions.

It is to be noted particularly that the upper portion of the standard 9 is provided with a hollow central chamber 24 which merges into the small passageway or duct 15. This chamber is provided with a plurality of radial apertures 25 which communicate with the air space around the standard 9.

Further, it is to be noted that a pair of weighted flaps or valves 26 are pivotally carried by rods 27 extending transversely through the chamber 4. These valves normally rest upon the upper portion of the main air inlet and constrict such portion. They are cut away, as indicated at 28, to closely surround the upper end of the standard 9 while allowing a small air space of annular contour around this standard.

The operation of the apparatus is as follows:—

Under slow engine speeds, the flaps 26 remain in the position shown in the drawing, and the air passes inwardly through the radial apertures 25 into the enlarged cavity 24 in the upper end of the standard. This inwardly passing air intimately mixes with the fuel sucked up through the duct 15. Further, the annular stream of air passing between the upper end of the standard and the flaps 26 mixes with this rich mixture and also aids in the thorough vaporization of the fuel.

Under increased engine speeds, the flaps 26 are rocked upwardly, thus enlarging the air opening around the upper end of the standard and, consequently, properly diluting the mixture for the high engine speeds.

The upward rocking motion of the flaps 26 is limited by the shoulder or top 5 of the mixing chamber 4. Thus, the movement of the flaps is controlled, and when the speed of the engine drops, they immediately fall into the position shown in the drawing. This adjustment is automatic and dependent wholly on the flow of air. No springs are employed and no adjustments are required for this portion of the apparatus.

Further, it is to be noted that the structure is extremely rugged and is fool-proof.

It is to be noted also that the carburetor consists of the minimum number of parts and that these parts may be very readily produced by ordinary machine shop processes.

Although the invention has been described in considerable detail, such description is intended as illustrative rather than limiting as the invention may be variously embodied and as the scope of such invention is to be determined as claimed.

I claim:

In a carburetor the combination of a central air shell, a float chamber surrounding said shell, a central standard positioned within said shell and supported from said shell, said standard having a hollow interior, the supporting member for said standard having a duct placing the hollow interior of the standard in communication with the float chamber, said standard having a relatively small duct leading upwardly through the upper portion of the standard and controlled by a needle valve and opening into a relatively enlarged cavity in the upper portion of the standard, and a mixing chamber carried by said air shell above the upper portion of said standard, said standard having radial apertures opening into the upper enlarged cavity, and a pair of flaps pivotally mounted within the mixing chamber and adapted to contrict the air passage around the central standard for slow engine speeds, said needle valve being freely adjustable from the exterior of the carburetor.

In testimony that I claim the foregoing I have hereunto set my hand at Milwaukee, in the county of Milwaukee and State of Wisconsin.

JOHN B. DRAHONOVSKY.